(12) United States Patent
Fukaya et al.

(10) Patent No.: US 8,809,228 B2
(45) Date of Patent: Aug. 19, 2014

(54) OIL ADSORBENT AND METHOD OF MANUFACTURING OIL ADSORBENT

(75) Inventors: Taro Fukaya, Tokyo (JP); Shinetsu Fujieda, Kawasaki (JP); Shinji Murai, Sagamihara (JP); Akiko Suzuki, Tokyo (JP); Hideyuki Tsuji, Yokohama (JP); Tatsuoki Kohno, Tokyo (JP); Arisa Yamada, Tokyo (JP); Nobuyuki Ashikaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/344,769

(22) Filed: Jan. 6, 2012

(65) Prior Publication Data

US 2012/0172215 A1    Jul. 5, 2012

Related U.S. Application Data

(63) Continuation of application No. PCT/JP2009/003173, filed on Jul. 8, 2009.

(51) Int. Cl.

| | | |
|---|---|---|
| *B01J 20/26* | (2006.01) | |
| *B01J 20/06* | (2006.01) | |
| *B01J 20/32* | (2006.01) | |
| *C02F 1/68* | (2006.01) | |
| *C02F 1/00* | (2006.01) | |
| *C02F 1/48* | (2006.01) | |
| *C02F 1/28* | (2006.01) | |
| *C02F 101/32* | (2006.01) | |
| *C02F 1/38* | (2006.01) | |

(52) U.S. Cl.
CPC ............... *C02F 1/288* (2013.01); *B01J 20/06* (2013.01); *B01J 20/26* (2013.01); *C02F 2303/16* (2013.01); *B01J 20/3268* (2013.01); *B01J 20/3204* (2013.01); *B01J 2220/46* (2013.01); *C02F 1/681* (2013.01); *C02F 2001/007* (2013.01); *C02F 1/488* (2013.01); *C02F 1/281* (2013.01); *C02F 2101/32* (2013.01); *C02F 1/38* (2013.01); *C02F 1/285* (2013.01)
USPC ........................................... 502/402

(58) Field of Classification Search
USPC .................. 210/222, 671, 692, 693; 502/402; 252/62.54
See application file for complete search history.

(56) References Cited

U.S. PATENT DOCUMENTS

| | | | |
|---|---|---|---|
| 3,890,224 | A | 6/1975 | Weiss et al. |
| 4,206,080 | A | 6/1980 | Sato et al. |
| 5,318,635 | A * | 6/1994 | Kasica et al. .................... 127/69 |
| 5,900,146 | A * | 5/1999 | Ballard et al. ................ 210/222 |
| 6,387,995 | B1 | 5/2002 | Sojka |
| 6,468,942 | B1 * | 10/2002 | Sansalone ..................... 502/402 |
| 2008/0317794 | A1 | 12/2008 | Gellermann et al. |

FOREIGN PATENT DOCUMENTS

| | | |
|---|---|---|
| JP | 48-092288 | 11/1973 |
| JP | 51-038770 | 3/1976 |
| JP | 55-22312 | 2/1980 |
| JP | 55-022312 | 2/1980 |
| JP | 60-097087 | 5/1985 |
| JP | 2-241541 | 9/1990 |
| JP | 02-241541 | 9/1990 |
| JP | 07-102238 | 4/1995 |
| JP | 2008-307490 | 12/2008 |

OTHER PUBLICATIONS

International Search Report issued Nov. 17, 2009 in PCT/JP2009/003173 filed Jul. 8, 2009.
Combined Office Action and Search Report issued Aug. 17, 2012 in Singaporean Application No. 201200183-0.
Extended Search Report issued May 6, 2013 in European Patent Application No. 09847036.2.
Japanese Office Action issued Sep. 10, 2013, in Japan Patent Application No. 2011-521707 (with English translation).

* cited by examiner

*Primary Examiner* — Colleen Dunn
*Assistant Examiner* — Haytham Soliman
(74) *Attorney, Agent, or Firm* — Oblon, Spivak, McClelland, Maier & Neustadt, L.L.P.

(57) ABSTRACT

According to one embodiment, an oil adsorbent includes inorganic particles and a polymer formed on surfaces of or between the inorganic particles. The content rate of the inorganic particles is 50% by volume or more and 97% by volume or less relative to the inorganic particles and the polymer, and an area of the inorganic particles is 30% or more and 60% or less relative to a cross-section of the inorganic particles and the polymer.

16 Claims, No Drawings

OIL ADSORBENT AND METHOD OF MANUFACTURING OIL ADSORBENT

CROSS REFERENCE TO RELATED APPLICATIONS

This application is a Continuation Application of PCT Application No. PCT/JP2009/003173, filed Jul. 8, 2009, the entire contents of which are incorporated herein by reference.

FIELD

Embodiments described herein relate generally to an oil adsorbent for recovering oil from water and a method for manufacturing an oil adsorbent.

BACKGROUND

Recently, effective utilization of water resources is required because of industrial development. Therefore, reuse of wastewater such as industrial effluent and the like is very important. In order to achieve the purpose, purification of water, namely, to separate other substances from water is necessary.

As a method for separating other substances from liquid, various methods have been known. Examples of the methods include membrane separation, centrifugation, activated carbon adsorption, ozone treatment, flocculation, and removal of suspended matter with a particular adsorbent. By using such a method, chemical substances largely affecting environment such as phosphorus and nitrogen contained in water can be removed, and oil and clay dispersed in water can be removed.

Among these methods, the membrane separation is one most generally used. However, when oil dispersed in water is removed, there is a problem that the oil tends to clog fine pores of the membrane to result in short life. Therefore, in many cases, the membrane separation is not appropriate for removal of oil in water. Thus, as a method for removing oil such as heavy oil from water include, for example, a method of gathering heavy oil floating on water surface with an oil fence set on water by making use of levitation property of heavy oil and suctioning to recover from the water surface, or a method of spreading hydrophobic matters having adsorbing property to heavy oil on water and adsorbing to recover heavy oil.

From the viewpoint of this, recently, an approach of immersing an oil adsorbent in water where oil is dispersed and adsorbing to remove the oil from water with the oil adsorbent has been tried. For example, JP-A 60-97087 (KO-KAI) discloses a technique of adsorbing to remove oil from water using an oil adsorbent comprising magnetic particles covered with organic substances such as resins on the surface thereof. However, according to the method, due to low dispersibility in water, the functional particles tend to settle in or float on the water surface; thus, the oil could not be efficiently adsorbed and removed.

Further, JP-A 07-102238 (KOKAI) discloses a method of adsorbing oil by using adsorptive polymer as an oil adsorbent having a hydrophilic block and a lipophilic block, and then removing the adsorptive polymer from water. However, such a method has a problem that not only it takes much labor to separate the adsorptive polymer and water but also the adsorptive polymer to which the oil is adsorbed is made softened to deteriorate the mechanical strength, resulting in poor workability.

DETAILED DESCRIPTION

In general, according to one embodiment, an oil adsorbent includes inorganic particles and a polymer formed on surfaces of or between the inorganic particles. The content rate of the inorganic particles is 50% by volume or more and 97% by volume or less relative to the inorganic particles and the polymer, and an area of the inorganic particles is 30% or more and 60% or less relative to a cross-section of the inorganic particles and the polymer.

Hereinafter, embodiments of an oil adsorbent, a method of manufacturing the oil adsorbent, and a method for recovering the oil with the oil adsorbent will be described sequentially.

(Oil Adsorbent)

In an oil adsorbent in the embodiment, inorganic particles form cores, which are covered with a polymer and are aggregated. In the embodiments, a ratio of the inorganic particles to the oil adsorbent is, in terms of volume, from 50 to 97% and preferably from 70 to 90%, and an area of the inorganic particles present in a cross-section of the oil adsorbent is from 30 to 60% to the total.

When the ratio of the inorganic particles is smaller than 50%, voids between the particles becomes small and the oil becomes difficult to permeate into the inside; thus, oil adsorbing capacity becomes smaller. Further, when the ratio of the inorganic particles exceeds 97%, since a resin amount is too small, the sufficient mechanical strength for use in water cannot be obtained. Still further, when the area of the inorganic particles present in a cross-section of the oil adsorbent is less than 30%, the mechanical strength of the oil adsorbent becomes too small to be practically applied. When the area becomes larger than 60%, a space capable of holding the oil decreases to result in being small in the oil adsorbing capacity.

By forming into such a structure, while maintaining the mechanical strength of the oil adsorbent, the oil adsorbing capacity can be maximized.

A percentage in terms of volume can be calculated from a solid content of polymer and a solid content of particles in the raw material. However, it can be obtained by heating a product to 500° C. or more in an oxygen-free state to volatilize all resin to measure a resin content. Further, an area of the inorganic particles present in a cross-section can be obtained in such a manner that a cross-section obtained by embedding an oil adsorbent in an embedding resin such as an epoxy resin and by cutting it is observed with SEM or an optical microscope, and particles and other than the particles are binarized (binarization). A cross-sectional area of the oil adsorbent is an area obtained by connecting the inorganic particles present in the outermost shell, and a ratio of an area of the inorganic particles occupying in the area is calculated. Further, a threshold value upon binarization is a value by which the brightness of the inorganic particles and that of a portion other than those can be distinctly separated. For example, a value of a valley portion between brightness peaks of the inorganic particles and the polymer may well be taken as the threshold value.

Further, it is preferable to have a gradient structure where the particles are present much on a surface of the oil adsorbent and less in the inside thereof. A hollow oil adsorbent can be used as well. When such a structure is formed, since a space for storing oil is formed inside thereof, the oil adsorbing capacity increase, and, since particle density of the outside is high, also the mechanical strength can be maintained.

As long as the oil adsorbent is formed like this, a manufacturing method thereof is not particularly restricted. For example, when a spray drying method such as spray drying is used, force does not work during aggregation; thus, aggregates having voids between particles can be readily manufactured. In particular, when the spray drying is conducted at a temperature higher by 30° C. or more, preferably 50° C. or more than the boiling point of the solvent, a surface is instantaneously formed by rapid drying and the solvent remained inside thereof expands and comes out, thereby particles having particle density difference between a surface layer and the inside can be formed.

The inorganic particles form cores of the oil adsorbent; thus, the inorganic particles are properly selected from those that do not cause a large chemical reaction even when dipped in water for a short time.

Examples of the usable inorganic particles include particles of ceramics such as fused silica, crystalline silica, glass, talc, alumina, calcium silicate, calcium carbonate, barium sulfate, magnesia, silicon nitride, boron nitride, aluminum nitride, magnesium oxide, berylium oxide, mica and so on; or particles of metal such as aluminum, iron, copper and alloys thereof and so on or oxides thereof such as magnetite, ilmenite, pyrrhotite, magnesia ferrite, cobalt ferrite, nickel ferrite, barium ferrite and so on.

The metal particles are preferred to contain a magnetic material because, when the oil adsorbent is recovered, the magnetic material works advantageously.

The magnetic material is not restricted to particular material but is desirable to be a substance showing a ferromagnetic property in a room temperature region. However, upon conducting the embodiment, the magnetic material is not restricted thereto, and ferromagnetic materials can be used in general. Examples of the magnetic materials include iron, alloys containing iron, magnetite, ilmenite, pyrrhotite, magnesia ferrite, cobalt ferrite, nickel ferrite, barium ferrite and so on.

Among these, the ferrite compounds excellent in the stability in water can more effectively achieve the embodiments. For example, $Fe_3O_4$, namely, magnetite is not only cheap but also stable as a magnetic material and also safe as an element; thus, magnetite is preferably used because it is easy to use in water treatment.

A size and a shape of the magnetic material are not particularly restricted as long as an area of the cross-section when formed into aggregates is from 30 to 60%. An average particle size of the magnetic material is preferable to be from 0.05 to 100 μm and more preferable to be from 0.5 to 5 μm. Here, the average particle size is measured according to a laser diffraction method. Specifically, SALD-DS21 measurement apparatus (manufactured by Shimadzu Corporation) or the like is used to measure.

When the average particle size of the magnetic material is larger than 100 μm, unfavorably, aggregated particles are excessively large to be poor in the dispersion into water when recovering oil, and an effective surface area of the particles decreases to tend to decrease in adsorbing capacity of the oil and so on. Further, when the average particle size is smaller than 0.05 μm, unfavorably, primary particles densely aggregate and a sufficient space to adsorb the oil cannot be obtained, thereby performance tends to be deteriorated. Here, terms primary particle and secondary aggregate are used for convenience. The primary particle means a single particle having a spherical shape, a polyhedral shape, or an indefinite shape, and the secondary aggregate means an aggregate of the primary particles and the same as the oil adsorbent according to the embodiments.

The above-mentioned average particle size is preferable, without restricting to the magnetic material, also in inorganic particles such as the ceramic particles and nonmagnetic metal particles, and similar advantages are exerted.

In the embodiment, a polymer that covers the cores of the oil adsorbent formed of the inorganic particles and so on may be any of polymers as long as the polymer adsorbs the oil. A polymer having, as a polymer backbone, at least one of styrene, butadiene, isoprene, acrylonitrile, alkyl acrylate, and alkyl methacrylate is high in the oil adsorbing capacity and desirable.

(Manufacture of Oil Adsorbent)

Hereinafter, a manufacturing method of an oil adsorbent of the embodiment will be described.

Firstly, the above-mentioned inorganic particles and so on, a polymer, and a solvent A are prepared, and these are mixed to fabricate a predetermined slurry solution.

The solvent A is not particularly restricted as long as it can dissolve a polymer to form a slurry solution where inorganic particles are dispersed, and is preferably a polar solvent. The polar solvent is excellent in the hydrophilicity and is compatible with hydroxyl groups slightly present on surfaces of the inorganic particles to uniformly disperse the inorganic particles in the polar solvent without aggregating.

In the embodiment, "the hydrophilicity" defines to be freely compatible with water, specifically, a state where, when the solvent is mildly mixed with pure water of the same amount under one atm. and at 20° C., and also after flow is calmed, the mixture can maintain uniform appearance.

Examples of the hydrophilic solvents include methanol, ethanol, n-propanol, isopropanol, acetone, tetrahydrofuran. Acetone and tetrahydrofuran that can dissolve various polymers are preferred.

On the other hand, when the solvent A is a nonpolar solvent, the solvent A is a hydrophobic solvent (defined as a solvent solubility in water of which is 10% or less); thus, in some cases, inorganic particles aggregate in a slurry solution to be ununiform. Therefore, when an oil adsorbent is manufactured according to spray drying described below, an oil adsorbent that does not contain inorganic particles, or an oil adsorbent containing only inorganic particles is manufactured; thus, a step of separating defective products inappropriate as practical oil adsorbent is needed. Further, since also the compositions of the defective products are not uniform, when returning into the slurry solution upon reusing, a compositional analysis of the defective products is needed in order to maintain the solvent concentration at a set value, making the a step of reuse troublesome.

Next, the resultant slurry solution is spray-dried. In the spray-drying, a spray drying method is used where an organic solvent is removed from an organic material-containing solution to obtain a particulate organic material. In the embodiment, the organic material is a resin composite particle, that is, an oil adsorbent according to the embodiments in which the inorganic particles are used as cores circumference of which is covered with the above polymer.

According to the spray drying method, by controlling an ambient temperature and a spraying speed upon spray-drying, an average particle size of secondary aggregates where primary particles aggregated can be controlled, and also voids are formed when the organic solvent is removed from between the aggregated primary particles, making it possible to readily form a porous structure preferable as the oil adsorbent.

The ambient temperature during spray drying due to the spray drying method is preferable to be higher by 30° C. or more than the boiling point of the solvent A. This is because by speedily vaporizing the solvent A from the oil adsorbed particles to form an outer shell before a solvent in the inside is volatilized, by which the density difference of the primary particles between the inside and the outer shell can be formed.

When the temperature difference is smaller than 30° C., the outer shell is formed slowly; thus, the solvent is volatilized substantially simultaneously with the inside, where the density difference is difficult to establish in some cases.

The spray drying method may be any of well known spray drying methods. Examples thereof include a disc type, a pressurized nozzle type, and two-fluid nozzle type.

(Oil Recovering Method)

Next, a method of recovering oil using the oil adsorbent will be described. The oil recovering is to separate the oil from water containing the oil. Here, the "oil" means, among organic materials mixed with and dispersed in water, a component that is generally liquid at room temperature, difficult to dissolve in water, relatively high in the viscosity, and lower in the specific gravity than water. More specifically, examples thereof include animal and plant fats and oil, hydrocarbons, aromatic oil and so on. These are represented by fatty acid glycerides, petroleum, higher alcohols and so on. Each type of oil is unique in the functional group contained therein; thus, in accordance therewith, the polymer and functional group constituting the oil adsorbent can be selected.

At the beginning, an oil adsorbent is immersed and dispersed in water containing the oil. As described above, a lipophilic polymer is formed on the surface of the oil adsorbent owing to a molecular structure, and thus, the oil is adsorbed by the polymer owing to the affinity between the polymer and the oil. At this time, if the surface of the oil adsorbent is not flat but preferably porous, the adsorption efficiency for the oil becomes high. As described above, when the oil adsorbent is manufactured using the spray drying method, a relatively porous adsorbent can be formed, making it possible to improve the adsorption efficiency for the oil.

After the oil is adsorbed by the oil adsorbent, the oil adsorbent is separated from water and the oil in water is separated and removed. The oil adsorbent can be readily separated by the use of a well-known method such as precipitation due to the gravity or centrifugal force with cyclone. Further, when the inorganic particles contain a magnetic material, separation by magnetic force can be used together.

Water that is a target of the oil recovering treatment is not particularly restricted. Specifically, industrial waste water, sewage water, human sewage and so on can be used. The oil concentration contained in water to be treated is neither particularly restricted.

Then, after the oil is adsorbed with the oil adsorbent and removed from water, the oil adsorbent is washed with a solvent B to remove the adsorbed oil. The solvent B has to be one that does not dissolve the polymer used in the oil adsorbent. Specifically, a polymer is used of which solubility in the solvent B is 1000 mg/L or less.

Such a solvent is different depending on a polymer used to cover or surface modification. Examples thereof include methanol, ethanol, n-propanol, isopropanol, butanol, isobutanol, hexyl alcohol, cyclohexanol, acetone, methyl ethyl ketone, methyl isobutyl ketone, methyl acetate, ethyl acetate, propyl acetate, butyl acetate, diethyl ether, isopropyl ether, dibutyl ether, tetrahydrofuran, dioxane, cyclohexane, chloroform, dimethyl aniline, Freon, n-hexane, cyclohexanone, toluene, xylene.

Among these, a non-polar solvent is particularly preferred. The non-polar solvent exhibits the hydrophobicity and becomes particularly high in the affinity with the oil; thus, the oil component adsorbed by the oil adsorbent can be simply and effectively washed. Further, when the nonpolar solvent is used, the deteriorated adsorbent can be very easily separated and removed. The "hydrophobicity" means that the solubility in water is 10% or less and the solvent separates from water. In particular, hexane is high in solubility of the oil and is always a stable liquid because it has the boiling point of 70° C., and thus, hexane is preferred because of its handling.

Further, as the solvent B, alcohol can also be preferably used. In this case, alcohol is readily replaced with water attached to or adsorbed on the surface of the oil adsorbent, making it easy to remove impurities other than oil. Among alcohols, methanol and ethanol having low boiling point are particularly preferable.

The step may include a method where the oil adsorbent is charged in a column, for example, and the solvent B is passed through the inside thereof, or a method where, when the oil adsorbent contains a magnetic material, in particular, the oil adsorbent is charged into a washing bath and much solvent B is charged simultaneously therein, and a cyclone or magnetic force is used for separation.

EXAMPLES

Hereinafter, Examples will be specifically described.

Example 1

Six parts by weight of polystyrene (G590, manufactured by Japan Polystyrene Corporation, density: 1.05 g/cm$^3$) were dissolved in 300 ml of tetrahydrofuran to prepare a solution, and 400 parts by weight of octahedral magnetite particles (density: 5.0 g/cm$^3$, specific surface area: 3.0 m$^2$/g) having an average particle size of 1000 nm were dispersed in the solution, thereby a composition was obtained.

The composition was sprayed at 100° C. with a mini-spray drier (Type B-290, manufactured by Shibata Kagaku KK) and spherically aggregated resin composite having an average secondary particle diameter of about 20 μm, namely, an oil adsorbent particle was manufactured.

When the oil adsorbent was observed with a SEM, the oil adsorbent particle was found to be formed into a porous body. When a SEM photograph of a cross-section of the oil adsorbent particle was taken and binarized to obtain the particle density, the oil adsorbent particle was obtained which had the particle area of 60%, and had a particle density difference with a void in the center.

When the compressive strength of the particle was measured with a microcompression tester (MCT-W500, manufactured by Shimadzu Corporation), it was 2.2 MPa. Further, when 0.1 g of the composition was charged into water of 20 ml containing 5000 ppm of machine oil (BENYSUN sewing machine oil, B-111), and an oil concentration in water was investigated after stirring for 1 min, it was found that 99.6% of oil was adsorbed.

Results are summarized in Table 1. The density difference between the outside and the inside was evaluated as follows; hollow (◎), gradient (○), and almost no gradient (×). The particle strength was evaluated as follows; compressive strength of 2 MPa or more (◎), no collapse when stirred in water (○), and collapse when stirred in water (×). The oil adsorption rate was evaluated as follows; 99% or more (◎), 97% or more and less than 99% (○), and less than 97% (×).

Examples 2 to 5

Except that an amount of a resin (content rate of inorganic particles) was changed, in a manner similar to Example 1, samples were prepared. Results are shown in Table 1. The less the amount of resin was (the large the content rate of inorganic particles was), the less the inorganic particles in a cross-section was, and the more voids tended to be generated. The less the amount of resin was, the better the oil adsorption rate was.

Comparative Example 1

Except that an amount of a resin was changed to 0.1 g, a sample was prepared in a manner similar to Example 1. Results are shown in Table 1. Although a composition formed an aggregate form immediately after spray drying, when the aggregates were stirred in water, the aggregates almost collapsed into primary particles. The oil absorbing capacity could not be evaluated.

Comparative Example 2

Except that an amount of the resin was changed to 10 g, a sample was prepared in a manner similar to Example 1. Results are shown in Table 1. Although a cross-section of a composition had the density difference of the inorganic particles between the inside and the outside, a gap between the inorganic particles of a surface of the composition was partly buried. The oil adsorption rate was measured as 96.9%.

Examples 6 to 8

Except that spray temperatures were changed, samples were prepared in a manner similar to Example 1. Results are shown in Table 1. As a temperature was raised, the density of the inorganic particles of a cross-section of a composition began to generate a gradient in the density. When a spray temperature was set to 120° C. (the boiling point+63.5° C.) or higher, about one half of oil adsorbent particles became hollow particles, and at 140° C., about 70% thereof became hollow particles. The oil adsorption rates were higher than the sample prepared at lower temperatures.

Comparative Example 3

Except that a spray temperature was changed to 55° C. (the boiling point−1.5° C.), a sample was prepared in a manner similar to Example 1. Results are shown in Table 1. As the temperature was lowered, the density gradient of the inorganic particles in a cross-section of a composition became difficult to establish, that is, a composition packed to the inside was formed. The oil adsorption rate was lower than a composition prepared at 75° C.

Examples 10 to 17

Except that in Examples 10 to 15, the type and an amount of a polymer were changed, and in Examples 16 and 17, the type of inorganic particles was changed, and a spray temperature was set to 120° C., samples were prepared in a manner similar to Example 1. Results are shown in Table 1. As along as the content rate of the inorganic particles and a ratio of the inorganic particles in a cross-section were controlled, even when the types of the polymer and inorganic particles were changed, compositions higher in the oil adsorbing capacity and higher in the mechanical strength could be obtained.

TABLE 1

| | Inorganic particle | Parts by weigh | Polymer | Parts by weight | Manufacturing temperature [° C.] | Content rate Inorganic particle/ (inorganic particle + polymer) (%) | Cross-sectional area Inorganic particle/ (inorganic particle + polymer) (%) |
|---|---|---|---|---|---|---|---|
| Example 1 | Magnetite | 40 | Polystyrene | 6 | 75 | 58.3% | 60 |
| Example 2 | Magnetite | 40 | Polystyrene | 8 | 75 | 51.2% | 59 |
| Example 3 | Magnetite | 40 | Polystyrene | 4 | 75 | 67.7% | 56 |
| Example 4 | Magnetite | 40 | Polystyrene | 1 | 75 | 89.4% | 56 |
| Example 5 | Magnetite | 40 | Polystyrene | 0.3 | 75 | 96.6% | 54 |
| Comparative Example 1 | Magnetite | 40 | Polystyrene | 0.1 | 75 | 98.8% | 57 |
| Comparative Example 2 | Magnetite | 40 | Polystyrene | 10 | 75 | 45.7% | 64 |
| Example 6 | Magnetite | 40 | Polystyrene | 6 | 100 | 58.3% | 50 |
| Example 7 | Magnetite | 40 | Polystyrene | 6 | 120 | 58.3% | 43 |
| Example 8 | Magnetite | 40 | Polystyrene | 6 | 140 | 58.3% | 31 |
| Comparative Example 3 | Magnetite | 40 | Polystyrene | 6 | 55 | 58.3% | 71 |
| Example 10 | Magnetite | 40 | PMMA | 6 | 120 | 61.5% | 47 |
| Example 11 | Magnetite | 40 | PMMA | 4 | 120 | 70.6% | 46 |
| Example 12 | Magnetite | 40 | PMMA | 1 | 120 | 90.6% | 51 |
| Example 13 | Magnetite | 40 | AS | 6 | 120 | 58.3% | 48 |
| Example 14 | Magnetite | 40 | Polyvinyl butyral | 6 | 120 | 59.5% | 48 |
| Example 15 | Magnetite | 40 | MS | 6 | 120 | 59.5% | 52 |
| Example 16 | Silica | 40 | PMMA | 6 | 120 | 75.1% | 60 |
| Example 17 | Iron powder | 40 | PMMA | 6 | 120 | 50.6% | 50 |

| | Temperature difference between temperature at production and boiling point of solvent [° C.] | Density difference between the inside and the outside, ◎: Hollow, ○: Yes, X: no | Particle strength, ◎: Compressive strength of 2 MPa or more, ○: No collapse upon mixing in water, X: Collapse upon mixing in water | Oil adsorption rate, ◎: 99% or more, ○: from 97% to 99%, X: up to 97% |
|---|---|---|---|---|
| Example 1 | 18.5 | ○ | ◎ | ◎ |
| Example 2 | 18.5 | ○ | ◎ | ○ |
| Example 3 | 18.5 | ○ | ◎ | ◎ |
| Example 4 | 18.5 | ○ | ○ | ◎ |
| Example 5 | 18.5 | ○ | ○ | ◎ |
| Comparative Example 1 | 18.5 | ○ | X | Impossible to evaluate |

TABLE 1-continued

| | | | | |
|---|---|---|---|---|
| Comparative Example 2 | 18.5 | ○ | ◎ | X |
| Example 6 | 43.5 | ○ | ◎ | ◎ |
| Example 7 | 63.5 | ◎ | ◎ | ◎ |
| Example 8 | 83.5 | ◎ | ◎ | ◎ |
| Comparative Example 3 | −1.5 | X | ◎ | X |
| Example 10 | 63.5 | ◎ | ◎ | ◎ |
| Example 11 | 63.5 | ◎ | ◎ | ◎ |
| Example 12 | 63.5 | ○ | ○ | ◎ |
| Example 13 | 63.5 | ◎ | ◎ | ◎ |
| Example 14 | 63.5 | ○ | ◎ | ◎ |
| Example 15 | 63.5 | ◎ | ◎ | ◎ |
| Example 16 | 63.5 | ○ | ○ | ◎ |
| Example 17 | 63.5 | ◎ | ◎ | ◎ |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An oil adsorbent particle, comprising: inorganic particles; and a polymer disposed on a surface of the inorganic particles, disposed between the inorganic particles, or both; wherein the oil adsorbent particle has a porous structure; a content of the inorganic particles is 50% to 97% by volume relative to the inorganic particles and the polymer; and a cross-sectional area of the inorganic particles in a cross-section of the oil adsorbent particle is 30% to 60% relative to an area of the cross-section of the oil adsorbent particle, and wherein the oil adsorbent particle is made by a process of mixing the inorganic particles, the polymer, and a solvent to obtain a slurry solution; and spraying the slurry solution in an environment whose temperature is higher by at least 30° C. than the boiling point of the solvent.

2. The oil adsorbent particle according to claim 1, wherein a density of the inorganic particles within the oil adsorbent particle decreases in a direction from a surface of the oil adsorbent particle toward an inside thereof.

3. The oil adsorbent particle according to claim 1, wherein the inorganic particles comprise a metal oxide.

4. The oil adsorbent particle according to claim 2, wherein the inorganic particles comprise a metal oxide.

5. The oil adsorbent particle according to claim 1, wherein the inorganic particles comprise a ceramic, a metal or a metal oxide,
the ceramic being selected from the group consisting of fused silica, crystalline silica, glass, talc, alumina, calcium silicate, calcium carbonate, barium sulfate, magnesia, silicon nitride, boron nitride, aluminum nitride, magnesium oxide, berylium oxide, and mica;
the metal being selected from the group consisting of aluminum, an alloy of aluminum, iron, an alloy of iron, copper, and an alloy of copper; and
the metal oxide being selected from the group consisting of magnetite, ilmenite, pyrrhotite, magnesia ferrite, cobalt ferrite, nickel ferrite, and barium ferrite.

6. The oil adsorbent particle according to claim 2, wherein the inorganic particles comprise a ceramic, a metal or a metal oxide,
the ceramic being selected from the group consisting of fused silica, crystalline silica, glass, talc, alumina, calcium silicate, calcium carbonate, barium sulfate, magnesia, silicon nitride, boron nitride, aluminum nitride, magnesium oxide, berylium oxide, and mica;
the metal being selected from the group consisting of aluminum, an alloy of aluminum, iron, an alloy of iron, copper, and an alloy of copper; and
the metal oxide being selected from the group consisting of magnetite, ilmenite, pyrrhotite, magnesia ferrite, cobalt ferrite, nickel ferrite, and barium ferrite.

7. The oil adsorbent particle according to claim 1, wherein the inorganic particles comprise a magnetic material selected from the group consisting of iron, an alloy of iron, magnetite, ilmenite, pyrrhotite, magnesia ferrite, cobalt ferrite, nickel ferrite, and barium ferrite.

8. The oil adsorbent particle according to claim 2, wherein the inorganic particles comprise a magnetic material selected from the group consisting of iron, an alloy of iron, magnetite, ilmenite, pyrrhotite, magnesia ferrite, cobalt ferrite, nickel ferrite, and barium ferrite.

9. The oil adsorbent particle according to claim 7, wherein the magnetic material is magnetite.

10. The oil adsorbent particle according to claim 8, wherein the magnetic material is magnetite.

11. The oil adsorbent particle according to claim 7, wherein the magnetic material has an average particle size of 0.05 to 100 μm.

12. The oil adsorbent particle according to claim 8, wherein the magnetic material has an average particle size of 0.05 to 100 μm.

13. The oil adsorbent particle according to claim 1, wherein the polymer has a polymer backbone selected from the group consisting of styrene, butadiene, isoprene, acrylonitrile, alkyl acrylate, and alkyl methacrylate.

14. The oil adsorbent particle according to claim 2, wherein the polymer has a polymer backbone selected from the group consisting of styrene, butadiene, isoprene, acrylonitrile, alkyl acrylate, and alkyl methacrylate.

15. The oil adsorbent particle according to claim 1, wherein the content of the inorganic particles is 70% to 90% by volume relative to the inorganic particles and the polymer.

16. The oil adsorbent particle according to claim 2, wherein the content of the inorganic particles is 70% to 90% by volume relative to the inorganic particles and the polymer.

* * * * *